US009567706B2

(12) United States Patent
Sugiyama

(10) Patent No.: US 9,567,706 B2
(45) Date of Patent: Feb. 14, 2017

(54) INK JET TEXTILE PRINTING METHOD

(71) Applicant: Seiko Epson Corporation, Tokyo (JP)

(72) Inventor: Takako Sugiyama, Tatsuno (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/331,868

(22) Filed: Jul. 15, 2014

(65) Prior Publication Data

US 2015/0054885 A1 Feb. 26, 2015

(30) Foreign Application Priority Data

Aug. 20, 2013 (JP) ................................ 2013-170171

(51) Int. Cl.

| | |
|---|---|
| ***C09D 11/10*** | (2014.01) |
| ***D06H 1/02*** | (2006.01) |
| ***D06P 5/30*** | (2006.01) |
| ***D06P 1/52*** | (2006.01) |
| ***D06P 1/673*** | (2006.01) |
| *B41M 5/00* | (2006.01) |

(52) U.S. Cl.

CPC ................ *D06H 1/02* (2013.01); *D06P 1/525* (2013.01); *D06P 1/5242* (2013.01); *D06P 1/5285* (2013.01); *D06P 1/5292* (2013.01); *D06P 1/6735* (2013.01); *D06P 5/30* (2013.01); *B41M 5/0017* (2013.01); *B41M 5/0047* (2013.01); *B41M 5/0064* (2013.01)

(58) Field of Classification Search

None

See application file for complete search history.

(56) References Cited

U.S. PATENT DOCUMENTS

| | | | | |
|---|---|---|---|---|
| 7,246,896 | B2 | 7/2007 | Askeland et al. | |
| 2012/0251795 | A1* | 10/2012 | Okada et al. .............. | 428/195.1 |
| 2013/0135382 | A1 | 5/2013 | Mitsuzawa et al. | |
| 2013/0222467 | A1* | 8/2013 | Ooishi et al. ................... | 347/21 |

FOREIGN PATENT DOCUMENTS

| | | | |
|---|---|---|---|
| JP | 2005-297567 | A | 10/2005 |
| JP | 2010-255133 | A | 11/2010 |
| JP | 2013-112701 | A | 6/2013 |

* cited by examiner

*Primary Examiner* — Alejandro Valencia

(74) *Attorney, Agent, or Firm* — Harness, Dickey & Pierce, P.L.C.

(57) ABSTRACT

An ink jet textile printing method includes applying a pretreatment liquid that contains a coagulant to a fabric, discharging a first ink composition from a first recording head to apply the first ink composition to the fabric, and discharging a second ink composition from a second recording head to apply the second ink composition to the fabric. The first ink composition contains water, pigment, and a cohesive resin. The second ink composition contains water, pigment, and a non-cohesive resin.

8 Claims, 2 Drawing Sheets

INK JET TEXTILE PRINTING METHOD

BACKGROUND

1. Technical Field

The present invention relates to an ink jet textile printing method.

2. Related Art

Various types of recording methods have hitherto been used in which an image based on an image data signal is formed on a recording method, such as paper. In particular, ink jet recording, in which inexpensive equipment is used to discharge an ink composition only to an intended image area to form an image directly on a recording medium, allows for efficient use of an ink composition and is of low running costs. Furthermore, ink jet recording produces little noise, which makes this type of recording method advantageous.

A known way to improve the quality of a recording in this ink jet recording is the use of pretreatment liquid. For example, JP-A-2005-297567 discloses a system for printing a durable ink jet ink image to provide an image with improved image durability parameters such as smudge resistance, water fastness, and humidity fastness and a method and a system for forming such an image. This system includes: a) a first printhead containing a fixer composition including a charged fixer component, the first printhead configured for ink jet printing the fixer composition on a substrate; b) a second printhead containing an ink composition, the second printhead configured for ink jet printing the ink composition over the fixer composition, the ink composition including a colorant carrying an opposite charge with respect to the charged fixer component; and c) a third printhead containing a polymer overcoat composition, the third printhead configured for ink jet printing the polymer overcoat composition over the ink composition, the polymer overcoat composition also carrying an opposite charge with respect to the charged fixer component.

There are also methods in which a fabric is used as a recording medium. For example, JP-A-2010-255133 discloses an ink jet textile printing method to provide an ink jet textile printing method in which pretreatment and recording are easily done and a high-quality image is formed free from unevenness. This method includes providing pretreatment liquid, with the use of a line ink jet head, to a fabric attached to an adhesive belt having an adhesive portion on the surface thereof (process A) and providing an ink containing coloring material to the fabric with the use of a line ink jet head (process B). Process A and process B are arranged online in this order. The speed at which the fabric is transported in process A and that in process B are equal.

Printing an image on a fabric with the system described in JP-A-2005-297567, however, damages the suppleness, feel, and other natural texture characteristics of the fabric because not only the ink composition but also the polymer overcoat composition aggregates through reaction with the fixer component. Maintaining the suppleness, feel, and other natural texture characteristics of a fabric is simply referred to as "texture retention" hereinafter. Note that "maintaining" the natural texture of a fabric does not mean that the condition before the application of the ink composition is completely preserved.

The ink jet textile printing method described in JP-A-2010-255133 also causes damage to the suppleness, feel, and other natural texture characteristics of the fabric as a result of the pretreatment liquid reacting with the coloring-material-containing ink. Furthermore, this method, in which a line ink jet head is used to provide the coloring-material-containing ink, is likely to cause banding (the occurrence of "lines (areas left unpainted with the ink)" due to deflection of ink droplets or other causes) compared to multiple-pass printing with a serial head.

However, printing an image on the fabric without the use of the pretreatment liquid leads to poor color development on the printed fabric. This means that there is a trade-off between color development and texture retention.

SUMMARY

An advantage of an aspect of the invention is that an ink jet textile printing method is provided by which a printed fabric excellent in both color development and texture retention can be obtained.

The inventors conducted extensive research to solve the above problems. As a result, the inventors found that a method that includes the application of pretreatment liquid, recording with a selected ink composition, and recording with another selected ink composition solves the above problems, and completed the invention.

More specifically, some aspects of the invention are as follows.

An ink jet textile printing method according to an aspect of the invention includes applying a pretreatment liquid that contains a coagulant to a fabric, discharging a first ink composition from a first recording head to apply the first ink composition to the fabric, and discharging a second ink composition from a second recording head to apply the second ink composition to the fabric. The first ink composition contains water, pigment, and a cohesive resin. The second ink composition contains water, pigment, and a non-cohesive resin.

In the ink jet textile printing method according to the above aspect, either or both of the first recording head and the second recording head may be a line head.

In the ink jet textile printing method according to one of above aspects, the second ink composition may be applied after the first ink composition is applied.

In the ink jet textile printing method according to any one of above aspects, the static surface tension of the second ink composition at 25° C. may be smaller than the static surface tension of the first ink composition at 25° C.

In the ink jet textile printing method according to any one of above aspects, the cohesive resin may include at least one of acrylic resin and urethane resin.

In the ink jet textile printing method according to any one of above aspects, the non-cohesive resin may include at least one of acrylic resin and silicone resin.

In the ink jet textile printing method according to any one of above aspects, the coagulant may be a cationic resin.

In the ink jet textile printing method according to any one of above aspects, a ratio A:B, where A is the amount of the first ink composition applied per unit area of the fabric and B is the amount of the second ink composition applied per unit area of the fabric, may be from 40:60 to 60:40 on a mass basis.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
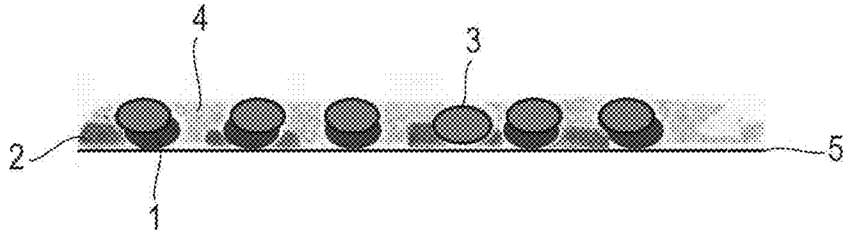
FIG. 1 is a schematic diagram that illustrates a printed fabric obtained by an ink jet textile printing method according to this embodiment.

The following describes an embodiment of the invention (hereinafter referred to as "this embodiment") in detail while referring to the drawings as necessary. No aspect of the invention is limited to this embodiment, and various modifications can be made without departing from the scope of that aspect of the invention. Like numbers in the drawings reference like elements, and duplicate descriptions are omitted. The positional relationships such as above, below, left, and right are based on the positional relationships illustrated in the drawings unless otherwise specified. The ratios between dimensions in the drawings are not limited to the illustrated ratios.

Ink Jet Textile Printing Method

An ink jet textile printing method according to this embodiment includes applying a pretreatment liquid that contains a coagulant to a fabric (application of pretreatment liquid), discharging a first ink composition from a first recording head to apply the first ink composition to the fabric (application of a first ink composition), and discharging a second ink composition from second recording head to apply the second ink composition to the fabric (application of a second ink composition). The first ink composition contains water, pigment, and a cohesive resin (a resin that easily aggregates). The second ink composition contains water, pigment, and a non-cohesive resin (a resin that is unlikely to aggregate).

An effective way to improve color development on a fabric is the use of a pretreatment liquid that contains a coagulant. This can improve color development by making the resin and the pigment in the ink composition aggregate. However, the natural texture retention of a fabric tends to be damaged when resin and pigment aggregates are the only materials on the fabric. As a solution to this, an ink jet textile printing method according to this embodiment involves the use of a second ink composition that contains a non-cohesive resin, which is unlikely to aggregate even if in contact with the pretreatment liquid, in addition to a first ink composition that contains a cohesive resin.

FIG. 1 illustrates a schematic view of a printed fabric obtained by an ink jet textile printing method according to this embodiment. FIG. 1 illustrates a cross-section of the printed fabric in the thickness direction. The ink compositions come down from above and adhere to the fabric 5. Applying the first ink composition and the second ink composition leads to the formation of a sharp image with excellent color development because the pigment 1 and the cohesive resin 2 in the first ink composition aggregate through reaction with the pretreatment liquid on the fabric 5 and the aggregates of the pigment 1 remain on the surface of the fabric 5 without penetrating into the fabric 5 as illustrated in FIG. 1. The pigment 3 in the second ink composition also aggregates through reaction with the pretreatment liquid on the fabric 5, filling unpainted areas due to ejection failure at some nozzles of the first head and lines resulting from banding. As a result, the solidity of the image (how much the image is filled with the ink compositions) is also improved. Furthermore, the non-cohesive resin 4 in the second ink composition does not aggregate on the fabric 5 and keeps the surface of the printed fabric smooth. As a result, a printed fabric is obtained with excellent texture retention, which is a natural property of the fabric, and excellent abrasion resistance and color development.

Application of Pretreatment Liquid

A pretreatment liquid that contains a coagulant is applied to a fabric. Examples of techniques that can be used to apply the pretreatment liquid include, but are not limited to, roller coating, spray coating, and ink jet coating.

Coagulant

Examples of coagulants include, but are not limited to, cationic resins, cationic surfactants, organic acid, and multivalent metal compounds. A single coagulant or a combination of two or more coagulants is used.

Examples of cationic resins include, but are not limited to, polyallylamine, poly(vinyl pyridine) salts, polyalkyl aminoethyl acrylate, polyalkyl aminoethyl polyethylene imine, polybiguanide, polyhexamethylene guanide, and polyguanide.

Examples of cationic surfactants include, but are not limited to, primary, secondary, and tertiary amine salt compounds, alkylamine salts, dialkylamine salts, aliphatic amine salts, benzalkonium salts, quaternary ammonium salts, quaternary alkyl ammonium salts, alkyl pyridinium salts, imidazolinium salts, sulfonium salts, phosphonium salts, and onium salts.

Examples of organic acids include, but are not limited to, glycolic acid, succinic acid, citric acid, acetic acid, and lactic acid.

Examples of multivalent metal compounds include halides, nitrates, and sulfates of multivalent metals. Examples of multivalent metals include, but are not limited to, magnesium, aluminum, calcium, titanium, manganese, iron, nickel, copper, and zinc. In particular, aluminum, calcium, and magnesium are preferred because of their potential to induce aggregation.

The user can choose an appropriate coagulant according to the user's requirements and other factors. For example, the use of a multivalent metal compound, which has a good potential to induce the aggregation of pigment, makes the printed fabric excellent particularly in terms of color development. The use of a cationic resin and a cationic surfactant not only provides the printed fabric with excellent color development and abrasion resistance but also prevents the natural texture of the fabric from being damaged.

The coagulant content is preferably from 5% to 20% by mass based on the total mass (100% by mass) of the pretreatment liquid. Ensuring that the coagulant content is in this range often leads to combined high levels of texture retention and color development.

The pretreatment liquid may further contain a solvent composed of at least one of water and a water-soluble organic solvent and optionally a pH-adjusting agent and/or a hydrotropic agent. Adding a pH-adjusting agent often improves the fixation of the pigment in the ink compositions to the fabric. Adding a hydrotropic agent often improves color development.

Application of a First Ink Composition

A first ink composition is applied to the fabric by discharge of the first ink composition from a first recording head. The first ink composition contains water, pigment, and a cohesive resin that satisfies the condition (1) below.

Condition (1): Adding 0.2 mL of a 20% by mass aqueous solution or dispersion of the cohesive resin to 10 mL of a 10% by mass aqueous solution of the coagulant produces an aggregate that does not pass through a filter with a pore size of 10 μm.

When the first ink composition is applied before the second ink composition, it is preferred that the amount of the first ink composition applied be such that the fabric should be covered. This ensures that the second ink composition adheres to the fabric with the first ink composition interposed and thereby prevents the second ink composition from penetrating into the fabric, often enhancing the color development and the solidity of the image and further reducing the occurrence of banding.

Application of a Second Ink Composition

A second ink composition is applied to the fabric by discharge of the second ink composition from a second recording head. The second ink composition contains water, pigment, and a non-cohesive resin that satisfies the condition (2) below.

Condition (2): Adding 0.2 mL of a 20% by mass aqueous solution or dispersion of the non-cohesive resin to 10 mL of a 10% by mass aqueous solution of the coagulant does not produce an aggregate that does not pass through a filter with a pore size of 10 μm.

Applying both the first ink composition and the second ink composition improves the abrasion resistance and the solidity of the image and helps to reduce the decline in image quality due to banding. The second ink composition can be applied before the first ink composition, simultaneously with the first ink composition, or after the first ink composition. This provides the printed fabric with excellent abrasion resistance and texture retention. A preferred mode is to apply the first ink composition and then the second ink composition. This often enhances abrasion resistance or texture retention.

Discharge Mechanism

Each of the first recording head, the second recording head, and the ink jet head that is used if ink jet coating is used to apply the pretreatment liquid can be a line head or a serial head. In line printing with a line head, the fabric is moved in a secondary scanning direction (the longitudinal direction of the fabric, the direction of transport) with the head in a fixed position, and ink droplets are discharged through nozzle openings of the head in conjunction with this movement, recording an image on the fabric. In serial printing with a serial head, the head is moved in a primary scanning direction (the lateral direction of the fabric, the width direction), and ink droplets are discharged through nozzle openings of the head in conjunction with this movement, recording an image on the fabric.

Figure 2:
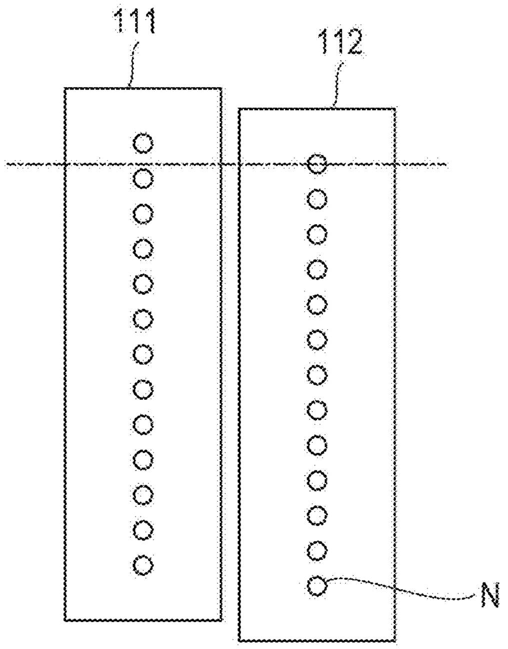
FIG. 2 is a bottom view of a nozzle arrangement at the bottom section of a first recording head and a second recording head.

FIG. 2 illustrates an example of a bottom view of a nozzle arrangement at the bottom section of a recording head. It is preferred that at least one of the first recording head and the second recording head be the recording head illustrated in FIG. 2. When the recording head is a line head, the nozzles N of the head units 111 and 112 that make up the recording head are in a staggered arrangement in which the nozzles N are displaced by half the pitch in the primary scanning direction as illustrated in FIG. 2. When the recording head is a serial head, the nozzles N are in a staggered arrangement in which the nozzles N are displaced by half the pitch in the secondary scanning direction. Such a head structure allows for the formation of a higher-resolution image.

Line Head

In particular, it is preferred that at least one of the first recording head and the second recording head be a line head because this improves, for example, the printing throughput. Although line printing is usually likely to cause banding compared to multiple-pass serial printing, an ink jet textile printing method according to this embodiment, in which the first ink composition and the second ink composition are printed with a first line head and a second line head, ensures that any lines resulting from banding are filled. The use of line printing, furthermore, often makes the printing process faster.

The term "line head" as used herein refers to an ink jet head whose length is equal to or greater than the width of the print range. In this mode of ink jet recording, droplets, such as ink droplets, are applied to all pixels in which dots should be formed, each time when the fabric passes under the carriage that holds the line head. Such a line head may be a single head whose length is equal to or greater than the width of the print range or a combination of two or more heads whose total length exceeds the width of the print range. It is also possible to use multiple line heads for one color when applying an ink composition that contains coloring material.

Figure 3:
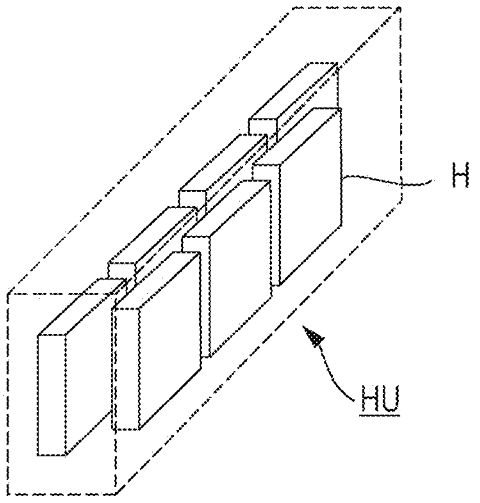
FIG. 3 is a schematic diagram that illustrates an exemplary structure of a line head.

FIG. 3 illustrates a schematic view of an exemplary structure of a line head. When a fabric with a wide print range is used, it is possible to use a head unit HU in which multiple heads H are in a staggered arrangement that covers the entire width of the fabric.

Figure 4:
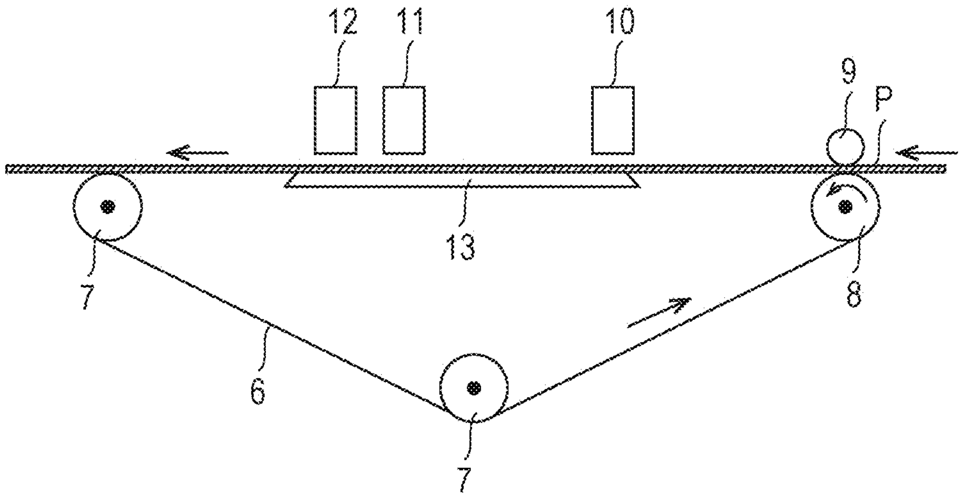
FIG. 4 is a schematic diagram that illustrates an example of a line-head-equipped ink jet textile printing apparatus that can be used in this embodiment.

FIG. 4 is a schematic diagram that illustrates a portion of an ink jet textile printing apparatus equipped with line heads. The ink jet textile printing apparatus illustrated in FIG. 4 has an adhesive belt 6, a transport roller 8 that drives the adhesive belt 6, rollers 7 that hold the adhesive belt 6, and a pretreatment liquid applicator 10 that applies pretreatment liquid. A first recording head 11 and a second recording head 12 are located downstream of the pretreatment liquid applicator 10. A hot plate 13 is located behind a piece of fabric P, facing the pretreatment liquid applicator 10, the first recording head 11, and the second recording head 12. An ink jet textile printing apparatus that can be used in this embodiment may have other elements, e.g., a controller for the application of pretreatment liquid and ink compositions.

The piece of fabric P transported from the right in FIG. 4 is held between a nip roller 9 and the adhesive belt 6 and fastened to the adhesive belt 6. The piece of fabric P is then transported to come under the pretreatment liquid applicator 10. The pretreatment liquid applicator 10 applies pretreatment liquid to the fabric, and at the same time the hot plate 13, located behind the piece of fabric P, starts heating. Preferably, the hot plate 13 extends over the region that faces the pretreatment liquid applicator 10, the first recording head 11, and the second recording head 12 so that the pretreatment liquid applied to the piece of fabric P out of the pretreatment liquid applicator 10 and the ink compositions applied to the piece of fabric P out of the first recording head 11 and the second recording head 12 can be heated immediately after application. Although the ink jet textile printing apparatus illustrated in FIG. 4 is for use in an ink jet textile printing method in which the first ink composition is applied first and then the second ink composition, this is not the only possible configuration. The arrangement of the first recording head 11 and the second recording head 12 in FIG. 4 may be reversed.

In a preferred mode, a warm air supplier (not illustrated) that contains a fan and a heating element is provided between the pretreatment liquid applicator 10 and the first and second recording heads 11 and 12 and used to control the surface temperature of the piece of fabric P at approximately 40° C. to 65° C. during transport and dry the pretreatment liquid. It is more preferred to adjust the flow of the warm air and provide a windbreak or a similar component to prevent the warm air from affecting the function of the pretreatment liquid applicator 10, the first recording head 11, and the second recording head 12.

The discharge of droplets is done through, for example, the expansion and contraction of a pressure chamber that communicates with the nozzle openings. The expansion and contraction of such a pressure chamber is done through, for example, the deformation of a piezoelectric vibrator. In such a head, the piezoelectric vibrator deforms in response to a drive pulse supplied thereto, thereby changing the volume of the pressure chamber. This change in volume leads to a change in the pressure applied to the pretreatment liquid or the ink composition in the pressure chamber. As a result, droplets are discharged through the nozzle openings.

Such an ink jet textile printing apparatus generates a drive signal that is a series of multiple drive pulses. Separately, printing data that includes tone information is transmitted to the heads. Only necessary drive pulses are extracted from the drive signal in accordance with the transmitted printing data and supplied to the piezoelectric vibrator. The amount of ink droplets discharged through the nozzle openings is thus changed in accordance with the tone information.

More specifically, an ink jet textile printing apparatus programmed with four tones consisting of non-recording printing data, printing data for small dots, printing data for medium dots, and printing data for large dots discharges different amounts of ink droplets in accordance with the specific tones.

A ratio A:B, where A is the amount of the first ink composition applied per unit area of the fabric and B is the amount of the second ink composition applied per unit area of the fabric, is preferably from 20:80 to 80:20 on a mass basis. More preferably, the ratio A:B is from 30:70 to 70:30. Even more preferably, the ratio A:B is from 40:60 to 60:40. Ensuring that the ratio of the amount of application A to the amount of application B is in these ranges often provides the printed fabric with excellent color development and texture retention and makes drying even faster.

Heating

An ink jet textile printing method according to this embodiment preferably includes heating the fabric as necessary during at least one of the application of pretreatment liquid, the application of the first ink composition, and the application of the second ink composition, between these operations, or after these operations. Such a heat treatment makes resins (polymers) that can be contained in the pretreatment liquid or the ink compositions fuse with the surface of the fabric and makes water evaporate. Heat treatment often enhances the abrasion resistance of the image.

Examples of heat treatments include, but are not limited to, heating with a hot plate like the aforementioned hot plate 13, heat pressing, atmospheric-pressure steaming, high-pressure steaming, and thermal fixation. Examples of heat sources for heating include, but are not limited to, infrared radiation (an infrared lamp). Such a heat treatment can be carried at any temperature at which resins (polymers) that can be contained in the ink compositions fuse and water evaporates, preferably 150° C. or more, more preferably around 150° C. to 200° C. Ensuring that the temperature of such a heat treatment is in these ranges often leads to more resistance to abrasion.

After the second ink composition is applied, the fabric may be washed with water and dried. This process may include soaping, i.e., washing away unfixed pigment with hot detergent or a similar material, if necessary.

Fabric

Examples of fabrics used in this embodiment include, but are not limited to, natural fibers such as silk, cotton, wool, nylon, polyester, and rayon and synthetic fibers. In particular, cotton is preferred because it can withstand the fixation of the ink compositions at a high temperature.

Ink Compositions

First Ink Composition

The first ink composition contains water, pigment, and a cohesive resin. The term "cohesive resin" as used herein refers to a resin particle that forms a large resin particle through the association of multiple resins upon contact with the coagulant. In a typical evaluation method for a cohesiveness test, 0.2 mL of a 20% by mass aqueous solution or dispersion of the resin is added to 10 mL of a 10% by mass aqueous solution of calcium carbonate as a coagulant, and it is tested whether an aggregate that does not pass through a filter with a pore size of 5 μm has formed, or the mixed aqueous solution is visually inspected for any clearly visible aggregate. The coagulant means the coagulant contained in the pretreatment liquid.

Preferably, the cohesive resin is one that forms an aggregate that does not pass through a filter with a pore size of 5 μm when 0.2 mL of a 20% by mass aqueous solution or dispersion of the resin is added to 10 mL of a 10% by mass aqueous solution of calcium carbonate as a coagulant.

Cohesive Resin

Examples of cohesive resins include, but are not limited to, acrylic resin, urethane resin, and acrylic-urethane copolymer resins. Preferably, the cohesive resin includes at least one of acrylic resin and urethane resin. This often enhances abrasion resistance. It is also preferred to use a resin based on a carboxyl-containing monomer, such as acrylic acid or methacrylic acid, for better cohesiveness.

Examples of cohesive urethane resins include, but are not limited to, RESAMINE D-9087 and RESAMINE D-1060 (Dainichiseika Color & Chemicals Mfg.) and SF460 and SF470 (Dai-ichi Kogyo Seiyaku). The use of such a cohesive resin often enhances texture and abrasion resistance.

The cohesive resin content is preferably from 1% to 15% by mass, more preferably from 2% to 5% by mass, based on the total mass (100% by mass) of the first ink composition. Ensuring that the cohesive resin content is in these ranges often enhances abrasion resistance and texture.

Second Ink Composition

The second ink composition contains water, pigment, and a non-cohesive resin. The term "non-cohesive resin" refers to a resin that has substantially no cohesiveness with respect to the coagulant. In a typical evaluation method for a cohesiveness test, 0.2 mL of a 20% by mass aqueous solution or dispersion of the resin is added to 10 mL of a 10% by mass aqueous solution of calcium carbonate as the coagulant, and it is tested whether an aggregate that does not pass through a filter with a pore size of 5 μm has formed, or the mixed aqueous solution is visually inspected for any clearly visible aggregate. The coagulant means the coagulant contained in the pretreatment liquid.

Non-Cohesive Resin

Examples of non-cohesive resins include, but are not limited to, acrylic resin and silicone resin. Preferably, the non-cohesive resin includes at least one of acrylic resin and silicone resin. This often enhances texture, abrasion resistance, and banding. The use of acrylic resin often provides excellent abrasion resistance and texture in particular, and the use of silicone resin often provides excellent texture retention, banding, and dry friction in particular. Adding acrylic resin as a main non-cohesive resin with a small amount of silicone resin often further improves both abrasion resistance and banding.

Examples of non-cohesive silicone resins include, but are not limited to, Polon MF-7 and MF-17 (dimethyl silicone emulsions, trade names of Shin-Etsu Chemical products) and Polon MF-18T (an epoxy-modified emulsion, a trade name of a Shin-Etsu Chemical product). The use of such a non-cohesive resin often enhances abrasion resistance.

The non-cohesive resin content is preferably from 1% to 15% by mass, more preferably from 2% to 5% by mass, based on the total mass (100% by mass) of the second ink composition. Ensuring that the non-cohesive resin content is in these ranges often enhances texture retention and banding.

In relation to texture retention and banding it is preferred that the second ink composition contain substantially no cohesive resin. Containing substantially no cohesive resin means that the cohesive resin content of the ink composition is, for example, 0.5% by mass or less, more preferably 0.1% by mass or less, even more preferably 0.05% by mass or less.

Resin Emulsion

The cohesive resin and the non-cohesive resin can be in any form. Preferably, these resins are in the form of emulsions in the respective ink compositions. Excellent abrasion resistance is often obtained when emulsions of these resins are contained in the respective ink compositions.

Resin emulsion, the resin in which fuses with itself and the pigment as the ink composition dries, fastening the pigment to the fabric, further improves the abrasion resistance and the washing fastness of the image portion of the printed fabric. Urethane resin emulsion and acrylic resin emulsion are preferred to other resin emulsions, and urethane resin emulsion is more preferred. This leads to excellent fixation of the ink composition, thereby providing the printed fabric with both excellent abrasion resistance and washing fastness.

Resin emulsion in an ink composition allows the ink composition to be sufficiently fixed to the fabric and provides the printed fabric with excellent abrasion resistance by forming a resin coating on the fabric. It is thus preferred that such a resin emulsion be a thermoplastic resin. In particular, urethane resin emulsion, which allows great freedom of design, makes it easy to obtain desired coating characteristics.

Urethane resin emulsion is an emulsion of a resin that has an urethane bond in the molecule. Urethane resin emulsions that can be used also include polyether-type urethane resins, which have an ether bond in the backbone in addition to the urethane bond, polyester-type urethane resins, which have an ester bond in the backbone, and polycarbonate-type urethane resins, which have a carbonate linkage in the backbone. Examples of acrylic resin emulsions include polymers of (meth)acrylic monomers, such as (meth)acrylic acid and (meth)acrylate, and copolymers of a (meth)acrylic monomer and another monomer.

The following describes preferred characteristics of resin emulsion. First, it is preferred that the resin emulsion have film-forming properties in the usual temperature range for ink jet recording (15° C. to 35° C.), hence the Tg is preferably 0° C. or less, more preferably −10° C. or less, even more preferably −15° C. or less. Ensuring that the Tg of resin emulsion is in these ranges enhances the fixation of the ink composition adhering to the printed fabric, thereby enhancing the abrasion resistance of the printed fabric. The lower limit of Tg is not limited, and it is preferably −70° C. or more, more preferably −50° C. or more.

The acid value of resin emulsion is preferably from 10 to 100 mg KOH/g, more preferably from 15 to 50 mg KOH/g. The washing fastness of the printed fabric remains good when this acid value is 100 mg KOH/g or less. Furthermore, making this acid value 10 mg KOH/g or more ensures excellent storage stability of the ink composition and excellent color developability and fixation of the ink composition on the fabric. The acid value mentioned herein is a value calculated by equation (1) with parameters measured with the use of AT610 available from Kyoto Electronics Manufacturing Co., Ltd.

$$\text{Acid value (mg/g)}=(EP1-BL1)\times FA1\times C1\times K1/\text{SIZE} \quad (1)$$

where EP1 represents the endpoint volume (mL), BL1 represents the blank volume (0.0 mL), FA1 represents the factor of the titrant (1.00), C1 represents a concentration equivalent (5.611 mg/mL) (equivalent to potassium hydroxide in 1 mL of 0.1 mol/L KOH), K1 represents a factor (1), and SIZE represents the amount of the sample collected (g).

The elongation at break of resin emulsion is preferably from 500% to 1200%, more preferably from 600% to 1200%, even more preferably from 700% to 1200%. The elastic modulus of resin emulsion is preferably from 20 to 400 MPa. Ensuring that the elongation at break or the elastic modulus is these ranges often prevents the image, or more specifically the ink layer, from breaking or cracking, particularly on a highly stretchable fabric, thereby enhancing the washing fastness and the abrasion resistance of the printed fabric.

The elongation at break mentioned herein can be measured on an about 60-μm thick film under 20-mm tensile test gauge length and 100-m/min tensile test speed conditions. The elastic modulus mentioned herein can be measured by preparing an about 60-μm thick film, shaping it into a tensile test dumbbell measuring 10 mm wide and 40 mm long in the parallel section, and performing a tensile test in accordance with JIS K7161:1994.

A detailed description of JIS K7161:1994 is as follows. Its corresponding international standard is ISO 527-1:1993, and its title is Plastics—Determination of Tensile Properties. In outline, this standard specifies general rules for the measurement of tensile properties of plastics and plastic composites under given conditions.

The D50 of resin emulsion is preferably from 30 to 300 nm, more preferably 80 to 300 nm. Ensuring that the D50 is in these ranges allows the resin emulsion to be uniformly dispersed in the ink composition. It is more preferred that the lower limit of D50 be 100 nm because this enhances the abrasion resistance of the printed fabric.

Examples of commercially available urethane resin emulsions that are preferred from the viewpoint of the characteristics of resin emulsion described above include, but are not limited to, Sancure 2710 (a trade name of a product of The Lubrizol Corporation), PERMARIN UA-150 (a trade name of a product of Sanyo Chemical Industries, Ltd.), SUPERFLEX 460, 470, 610, and 700 (trade names of products of Dai-ichi Kogyo Seiyaku Co., Ltd.), NeoRez R-9660, R-9637, and R-940 (trade names of products of Kusumoto Chemicals, Ltd.), ADEKA BONTIGHTER HUX-380 and 290K (trade names of Adeka products), Takelac (registered trademark) W-605, W-635, and WS-6021 (trade names of products of Mitsui Chemicals, Inc.), and Polyether (a trade name of a product of TAISEI FINE CHEMICAL CO., LTD., Tg=20° C.).

A urethane resin emulsion can be used alone, and it is also possible to use a combination of two or more urethane resin emulsions.

An ink compositions used in this embodiment may contain a non-urethane-based resin emulsion. Anionic resin emulsions are preferred to other such resin emulsions because of their excellent dispersion stability. Examples of anionic resin emulsions include, but are not limited to, homopolymers or copolymers of (meth)acrylic acid, (meth) acrylate, acrylonitrile, cyanoacrylate, acrylamide, olefins, styrene, vinyl acetate, vinyl chloride, vinyl alcohol, vinyl ether, vinyl pyrrolidone, vinyl pyridine, vinyl carbazole, vinyl imidazole, and vinylidene chloride, fluoropolymers, and natural resins. In particular, it is preferred to use at least one of a (meth)acrylic resin and a styrene-(meth)acrylic acid copolymer-based resin, more preferably at least one of an acrylic resin and a styrene-acrylic acid copolymer-based resin, even more preferably a styrene-acrylic acid copolymer-based resin. The copolymer can be any of a random copolymer, a block copolymer, an alternating copolymer, and a graft copolymer.

Such a non-urethane-based resin emulsion can also be one prepared from a known material by a known process or a commercially available one. Examples of commercially available non-urethane-based resin emulsions include, but are not limited to, Mowinyl 966A (a trade name of a product of The Nippon Synthetic Chemical Industry Co., Ltd., an acrylic resin emulsion), MICROGEL E-1002 and MICROGEL E-5002 (trade names of products of Nippon Paint Co., Ltd), VONCOAT 4001 and VONCOAT 5454 (trade names of DIC products), SAE1014 (a trade name of a Zeon Corporation product), SAIVINOL SK-200 (a trade name of a product of SAIDEN CHEMICAL INDUSTRY CO., LTD.), JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, and JONCRYL 7610 (trade names of BASF products), and NK Binder R-5HN (a trade name of a Shin-Nakamura Chemical product, an acrylic resin emulsion, 44% solids). In particular, Mowinyl 966A, an acrylic resin emulsion, is preferred because it adequately fulfills the preferred characteristics of resin emulsion described above.

A single kind of resin emulsion can be used alone, and it is also possible to use a combination of two or more resin emulsions.

The resin content of resin emulsion is preferably from 3% to 15% by mass, more preferably 7% to 14% by mass, even more preferably 8% to 13% by mass, based on the total mass (100% by mass) of the ink composition. Ensuring that the resin content is in these ranges often enhances the washing fastness and the abrasion resistance of the printed fabric and provides the ink composition with excellent long-term storage stability, particularly by reducing the viscosity of the ink composition.

Static Surface Tension

Preferably, the static surface tension of the second ink composition at 25° C. is smaller than the static surface tension of the first ink composition at 25° C. This often reduces banding and enhances the solidity of the image. Static surface tension can be measured by the method described in Examples.

The static surface tension of the first ink composition at 25° C. is not limited. For example, it is preferably from 15 to 50 N/m, more preferably from 25 to 35 N/m. Ensuring that the static surface tension of the first ink composition at 25° C. in these ranges often leads to stable discharge of the first ink composition.

The static surface tension of the second ink composition at 25° C. is not limited. For example, it is preferably from 15 to 50 N/m, more preferably from 25 to 35 N/m. Ensuring that the static surface tension of the second ink composition at 25° C. in these ranges often leads to stable discharge of the second ink composition.

The following describes additives (components) that are contained or can be contained in these ink compositions (the first ink composition and the second ink composition) in detail.

Water

The water can be of any kind. Purified water, such as ion-exchanged water, ultrafiltered water, reverse-osmosis-purified water, or distilled water, or ultrapure water can be used. The water content can be, for example, from 20% to 80% by mass based on the total mass (100% by mass) of the ink composition. Ensuring that the water content is in this range provides the ink composition with a viscosity in an appropriate range.

Pigment

Depending on the type of pigment used, the pigment content is preferably from 1% to 30% by mass, more preferably from 1% to 15% by mass, based on the total mass (100% by mass) of the ink composition for reasons such as satisfactory color development. Examples of pigments include white pigments, black pigments, and color pigments. A single kind of pigment can be used alone, and it is also possible to use a combination of two or more pigments.

White Pigments

Examples of white pigments that can be used in this embodiment include, but are not limited to, white inorganic pigments such as titanium oxide, zinc oxide, zinc sulfide, antimony oxide, and zirconium oxide. In addition to such white inorganic pigments, white organic pigments can also be used, including white hollow plastic particles and polymer particles.

Examples of color indices (C.I.) of white pigments include, but are not limited to, C.I. Pigment White 1 (basic lead carbonate), 4 (zinc oxide), 5 (a mixture of zinc sulfide and barium sulfate), 6 (titanium oxide), 6:1 (titanium oxide and other metal oxides), 7 (zinc sulfide), (calcium carbonate), 19 (clay), 20 (mica titanate), 21 (barium sulfate), 22 (natural barium sulfate), 23 (gloss white), 24 (alumina white), 25 (gypsum), 26 (magnesium oxide and silicon oxide), 27 (silica), and 28 (anhydrous calcium silicate).

In particular, titanium oxide is preferred because it has excellent color developability and masking properties and a favorable dispersion particle diameter and also provides satisfactory visibility (brightness). Rutile titanium oxide, a form of titanium oxide commonly used as white pigment, is preferred to other forms. Rutile titanium oxide can be a self-produced one or a commercially available one. Examples of industrial processes for producing rutile titanium oxide (powder) include two well-known and commonly used processes, the sulfuric acid process and the chloride process. Examples of commercially available rutile titanium oxides include Tipaque (registered trademark) CR-60-2, CR-67, R-980, R-780, R-850, R-980, R-630, R-670, and PF-736 (trade names of products of ISHIHARA SANGYO KAISHA, LTD.).

Black Pigments

Examples of black pigments that can be used in this embodiment include, but are not limited to, carbon black. Examples of carbon blacks include, but are not limited to, furnace black, lamp black, acetylene black, and channel black (C.I. Pigment Black 7). Examples of commercially available carbon blacks include, but are not limited to, No. 2300, 900, MCF88, No. 20B, No. 33, No. 40, No. 45, No. 52, MA7, MA8, MA100, and No. 2200B (trade names, Mitsubishi Chemical Corporation), COLOUR BLACK FW1, FW2, FW2V, FW18, FW200, 5150, 5160, and 5170, PRINTEX 35, U, V, and 140U, SPECIAL BLACK 6, 5, 4A, 4, and 250 (trade names, Degussa AG), Conductex SC and Raven 1255, 5750, 5250, 5000, 3500, 1255, and 700 (trade names, Columbian Carbon Japan Ltd.), REGAL 400R, 330R, and 660R, MOGUL L, MONARCH 700, 800, 880, 900, 1000, 1100, 1300, and 1400, and ELFTEX 12 (trade names, Cabot Corporation). A single kind of inorganic pigment can be used alone, and it is also possible to use a combination of two or more inorganic pigments.

Color Pigments

Examples of color pigments that can be used in this embodiment include, but are not limited to, quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Specific examples of color pigments include the following.

Examples of pigments for cyan ink compositions include, but are not limited to, C.I. Pigment Blue 1, 2, 3, 15, 15:1, 15:2, 15:3, 15:4, 15:6, 15:34, 16, 18, 22, 60, 65, and 66 and C.I. Vat Blue 4 and 60. In particular, it is preferred to use at least one of C.I. Pigment Blue 15:3 and 15:4.

Examples of pigments for magenta ink compositions include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264 and C.I. Pigment Violet 19, 23, 32, 33, 36, 38, 43, and 50. In particular, it is preferred to use one or more selected from the group consisting of C.I. Pigment Red 122, C.I. Pigment Red 202, and C.I. Pigment Violet 19.

Examples of pigments for yellow ink compositions include, but are not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. In particular, it is preferred to use one or more selected from the group consisting of C.I. Pigment Yellow 74, 155, and 213.

Examples of pigments for ink compositions of other colors, such as green inks and orange inks, include well-known and commonly used ones. The ink composition may be clear ink compositions that contain no coloring material.

Pigment Dispersion

Preferably, the pigment is dispersed in the ink composition, i.e., in the form of pigment dispersion. The meaning of the pigment dispersion mentioned herein includes liquid dispersion of the pigment and slurry (low-viscosity aqueous dispersion) of the pigment.

Examples of pigment dispersions include, but are not limited to, self-dispersible pigments and polymer-dispersed pigments.

Self-Dispersible Pigment

Self-dispersible pigment is a pigment that can be dispersed or dissolved in an aqueous medium without a dispersant. The words "dispersed or dissolved in an aqueous medium without a dispersant" represent a state in which the pigment exists in a stable manner without a dispersant that would make the pigment disperse because, of a hydrophilic group existing on the surface of the pigment. Thus substantially no foaming occurs due to the decline in antifoaming properties that would be caused by a dispersant, making it easy to prepare an ink composition with excellent discharge stability. Furthermore, the great increase in viscosity that would occur with a dispersant is prevented, which allows for easier handling by, for example, making it possible to use a greater amount of pigment and thereby to fully enhance the color developability.

The aforementioned hydrophilic group is preferably one or more hydrophilic groups selected from the group consisting of —OM, —COOM, —CO—, $—SO_3M$, $—SO_2M$, $—SO_2NH_2$, $—RSO_2M$, $—PO_3HM$, $—PO_3M_2$, $—SO_2NHCOR$, $—NH_3$, and $—NR_3$.

In these chemical formulae, M represents a hydrogen atom, an alkali metal, ammonium, a substituted or unsubstituted phenyl group, or an organic ammonium, and R represents an alkyl group that contains 1 to 12 carbon atoms or a substituted or unsubstituted naphthyl group. M and R are selected independently of each other.

Self-dispersible pigment is produced by, for example, the bonding (grafting) of a hydrophilic group to the surface of pigment through physical treatment or chemical treatment of the pigment. Examples of physical treatments include vacuum plasma treatment. Examples of chemical treatments include wet oxidation, i.e., oxidation with an oxidizing agent in water, and a process in which p-aminobenzoic acid is bonded to the surface of the pigment so that the carboxyl group is attached with the phenyl group.

Polymer-Dispersed Pigment

Polymer-dispersed pigment is a pigment that is dispersible because of polymer dispersion. The polymer used in polymer-dispersed pigment can be of any kind. For example, the glass transition temperature (Tg) of a dispersion polymer for the dispersion of the pigment is preferably 55° C. or less, more preferably 50° C. or less. Ensuring that this Tg is 55° C. or less leads to good fixation of the ink composition.

The weight-average molecular weight of such a polymer as measured by gel permeation chromatography (GPC) is preferably 10,000 or more and 200,000 or less. This enhances the storage stability of the ink composition. The weight-average molecular weight (Mw) mentioned herein can be measured as a polystyrene-equivalent molecular weight by gel permeation chromatography (GPC) with the use of an L7100 system available from Hitachi, Ltd.

Such a polymer is preferably composed of 70% by mass or more copolymer of a (meth)acrylate and (meth)acrylic acid because this enhances the fixation of the ink composition and the glossiness of the printed fabric. In particular, a polymer is preferred that contains 70% by mass or more alkyl (meth)acrylate and/or cyclic alkyl (meth)acrylate, the alkyl containing 1 to 24 carbon atoms and the cyclic alkyl containing 3 to 24 carbon atoms. Specific examples of monomer components of such a polymer include, but are not limited to, methyl (meth)acrylate, ethyl (meth)acrylate, propyl (meth)acrylate, n-butyl (meth)acrylate, isobutyl (meth) acrylate, pentyl (meth)acrylate, hexyl (meth)acrylate, 2-ethyl hexyl (meth)acrylate, octyl (meth)acrylate, nonyl (meth)acrylate, decyl (meth)acrylate, t-butyl cyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth) acrylate. Examples of other monomer components that can be used for polymerization include hydroxy (meth)acrylates, which have a hydroxyl group, such as hydroxyethyl (meth) acrylate, hydroxypropyl (meth)acrylate, and diethylene glycol (meth)acrylate, urethane (meth)acrylate, and epoxy (meth)acrylate.

Such a polymer can be a cohesive resin or a non-cohesive resin, both defined herein, and preferably is a cohesive resin for excellent color development.

Polymer-Coated Pigment

Polymer-coated pigment, i.e., microencapsulated pigment, is preferred to other forms of polymer-dispersed pigment because it ensures excellent fixation of the ink composition and excellent glossiness and color reproduction on the printed fabric.

Polymer-coated pigment can be obtained by the phase-inversion emulsification process described below. A polymer that can be used in polymer-dispersed pigment is dissolved in an organic solvent, such as methanol, ethanol, isopropanol, n-butanol, acetone, methyl ethyl ketone, or dibutyl ether. Pigment is added to the obtained solution, and the resulting mixture is subjected to kneading and dispersion with a neutralizing agent and water, yielding an oil-in-water dispersion. Removing the organic solvent from the obtained dispersion yields polymer-coated pigment in the form of aqueous dispersion. The kneading and dispersion can be done with the use of a ball mill, a roll mill, a bead mill, a high pressure homogenizer, or a high-speed stirring dispersing machine, for example.

Examples of preferred neutralizing agents include, but are not limited to, ethyl amine, tertiary amines such as trimethyl amine, lithium hydroxide, sodium hydroxide, potassium hydroxide, and ammonia. The pH of the aqueous dispersion is preferably from 6 to 10.

For stable dispersion of pigment it is preferred that the polymer with which the pigment is coated be preferably one that has a weight-average molecular weight of approximately 10,000 to 150,000 as measured by GPC.

Polymer-coated color pigment is preferred to other forms of polymer-coated pigment. The use of this type of color pigment leads to excellent color development on the printed fabric.

The polymer used in such a polymer-coated pigment can be a cohesive resin or a non-cohesive resin, both defined herein, and preferably is a cohesive resin for excellent color development.

Cyclic Amide Compound

An ink composition used in this embodiment preferably contains a cyclic amide compound. Adding a cyclic amide compound to the ink composition enhances the potential to dissolve urethane resin (emulsion) and helps to more effectively prevent any foreign matter in the ink composition from separating out, thereby enhancing storage stability, in particular, high-temperature storage stability.

Furthermore, the moisture retention capability of a cyclic amide compound prevents components of the ink composition, such as urethane resin (emulsion) or any other resin (polymer) and pigment, from aggregating and solidifying in conjunction with the evaporation of water while the ink composition is stored. This often prevents clogging near the nozzles of a head during ink jet recording, leading to enhanced discharge stability of the ink composition.

Examples of cyclic amide compounds include, but are not limited to, 2-pyrrolidone, N-methyl-2-pyrrolidone, and N-ethyl-2-pyrrolidone. In particular, 2-pyrrolidone is preferred because it is superior in enhancing the potential to dissolve resins (polymers) and enhancing storage stability, in particular, high-temperature storage stability.

A cyclic amide compound can be used alone, and it is also possible to use a combination of two or more cyclic amide compounds.

The content of such a cyclic amide compound is preferably from 0.5% to 5% by mass, more preferably from 1% to 3% by mass, based on the total mass (100% by mass) of the ink composition. Ensuring that this content is in these ranges enhances the long-term storage stability and the discharge stability of the ink composition and also enhances the abrasion resistance and the washing fastness of the printed fabric, which are associated with the excellent fixation of the ink composition.

Note that the additives (components) described below exclude cyclic amide compounds so that duplication should be avoided.

Penetrant

Preferably, an ink composition used in this embodiment further contains a penetrant. Quick penetration of the ink composition into the fabric ensures that the printed fabric is obtained with little bleeding in the image.

Examples of preferred penetrants for this purpose include, but are not limited to, alkyl ethers of polyhydric alcohols (glycol ethers) and 1,2-alkanediols. Examples of glycol ethers include, but are not limited to, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether. Examples of 1,2-alkanediols include, but are not limited to, 1,2-pentanediol and 1,2-hexanediol. Other diols of linear hydrocarbons can also be used, including 1,3-propanediol, 1,4-butanediol, 1,5-pentanediol, 1,6-hexanediol, 1,7-heptanediol, and 1,8-octanediol.

A penetrant can be used alone, and it is also possible to use a combination of two or more penetrants.

The content of such a penetrant is preferably from 0.1% to 20% by mass, more preferably from 0.5% to 10% by mass, based on the total mass (100% by mass) of the ink composition. Making this content 0.1% by mass or more increases the penetrance of the ink composition into the fabric. Making this content 20% by mass or less prevents bleeding from occurring in the image and also ensures that the viscosity of the ink composition is not high.

Humectant

Preferably, an ink composition used in this embodiment further contains a humectant (a moisturizing agent). Such a humectant can be of any kind that is commonly used in ink jet ink. The boiling point of such a humectant is preferably 180° C. or more, more preferably 200° C. or more. A humectant provides the ink composition with good water retention capability and wetting properties.

Specific examples of humectants with a high boiling point include, but are not limited to, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycols with a number-average molecular weight of 2000 or less, 1,3-propylene glycol, isopropylene glycol, isobutylene glycol, glycerol, meso-erythritol, and pentaerythritol.

A humectant can be used alone, and it is also possible to use a combination of two or more humectants. An ink composition that contains a humectant with a high boiling point maintains fluidity and redispersibility for long periods of time even if left opened with the pigment ink exposed to the air. Furthermore, such an ink composition has excellent discharge stability because it is unlikely to cause nozzles to clog up during textile printing with ink jet textile printing apparatus or upon restart after an interruption of such a printing process. The content of such a humectant is not limited and can be determined as appropriate for the user's needs.

When an ink composition contains a cyclic amide compound, it is preferred to use the cyclic amide compound as humectant because cyclic amide compounds have a moisture retention capability as mentioned above.

Surfactant

An ink composition used in this embodiment preferably contains a surfactant. Such a surfactant can be of any kind, and it is preferred to use at least any of an acetylene glycol surfactant, an acetylene alcohol surfactant, and a polysiloxane surfactant, for example. Adding such a surfactant to an ink composition makes the ink composition dry even faster on the fabric and allows for high-speed printing.

In particular, a polysiloxane surfactant is more preferred than others because it leads to increased solubility in the ink composition, which makes it more unlikely that any foreign matter will appear in the ink composition.

The acetylene glycol surfactant and the acetylene alcohol surfactant can be of any kind, and it is preferred to use one or more selected from 2,4,7,9-tetramethyl-5-decin-4,7-diol and alkylene oxide adducts of 2,4,7,9-tetramethyl-5-decin-4,7-diol and 2,4-dimethyl-5-decin-4-ol and alkylene oxide adducts of 2,4-dimethyl-5-decin-4-ol, for example. Such surfactants are commercially available as OLFINE 104 surfactants, OLFINE E1010 and other E surfactants (trade names of products of Air Products Japan, Inc.), SURFYNOL 465 and SURFYNOL 61 (trade names of products of Nissin Chemical Industry Co., Ltd.), and so forth.

Examples of polysiloxane surfactants include, but are not limited to, BYK-347 and BYK-348 (trade names of products of BYK Japan KK).

Such a surfactant preferably constitutes 0.1% to 3% by mass of the total mass (100% by mass) of the ink composition.

Other Components

An ink composition used in this embodiment may contain various additives as deemed appropriate for the maintenance of good storage stability and stability during discharge from a head, the improvement of clogging, or the prevention of degradation of the ink composition. Examples of additives that can be used include dissolution aids, viscosity modifiers, pH-adjusting agents, antioxidants, preservatives, antimolds, anticorrosives, and chelating agents for capturing metal ions that would affect dispersion. An ink composition used in this embodiment is preferably an aqueous ink composition, in which the most abundant component is water, for the sake of safety.

Ink Jet Textile Printing Apparatus

An ink jet textile printing apparatus that can be used in this embodiment can be of any kind that carries out recording by the ink jet textile printing method described above, and its structure can be the same as that of known apparatus except for the foregoing.

EXAMPLES

The following describes an aspect of the invention in more detail by providing examples and comparative examples. No aspect of the invention is limited to these examples.

Materials for Ink Compositions

The following is a list of some important materials used to prepare the ink compositions used in Examples and Comparative Examples below.

Ink Compositions

Pigment

Cyan Dispersion

Production Example 1

Resins

Urethane cohesive resin (trade name, PERMARIN UA-150; Sanyo Chemical Industries, Ltd.; solid concentration, 30%)

Acrylic cohesive resin (a resin in which methyl methacrylate, acrylic acid, stearyl acrylate, and 2-ethylhexyl methacrylate were used as monomers; solid concentration, 30%)

Acrylic non-cohesive resin (trade name, NK Binder R-5HN; Shin-Nakamura Chemical; solid concentration, 44%)

Silicone non-cohesive resin (trade name, Polon MF-18T; Shin-Etsu Chemical; solid concentration, 38%)

The cohesiveness of each resin was determined by adding 0.2 mL of a 20% by mass aqueous resin dispersion to 10 mL of a 10% by mass aqueous solution of calcium carbonate as a coagulant and testing whether an aggregate that did not pass through a filter with a pore size of 5 μm had formed.

Humectants

Glycerol

Triethylene glycol (TEG)

Cyclic Amide Compound

2-Pyrrolidone

Surfactant

BYK348 (BYK Japan KK)

Pretreatment Liquids Containing a Coagulant

Polyallylamine (NITTOBO MEDICAL CO., LTD.; trade name, PAA-HCL-03; 40% solids)

Calcium Nitrate

Production Example 1

Cyan Pigment Dispersion

Cyan pigment dispersion was prepared as follows. A reaction vessel equipped with a stirrer, a thermometer, a reflux tube, and a dropping funnel was filled with nitrogen, and then 20 parts by mass of cyclohexyl acrylate, 5 parts by mass of 2-ethylhexyl acrylate, 15 parts by mass of butyl acrylate, 10 parts by mass of lauryl acrylate, 2 parts by mass of acrylic acid, and 0.3 parts by mass of t-dodecylmercaptan were mixed. The mixture was heated at 70° C., and the dispersed polymer was allowed to polymerize while separately prepared 150 parts by mass of cyclohexyl acrylate, 15 parts by mass acrylic acid, 50 parts by mass of butyl acrylate, 1 part by mass of t-dodecylmercaptan, 20 parts by mass of methyl ethyl ketone, and 1 part by mass of azobisisovaleronitrile were added dropwise into the reaction vessel through the dropping funnel over 4 hours. Then methyl ethyl ketone was added to the reaction vessel, yielding a 40% by mass solution of the dispersed polymer. The molecular weight dispersity (Mw/Mn) was 3.1.

The weight-average molecular weight (Mw) mentioned herein was measured by the method described above. The number-average molecular weight (Mn) mentioned herein is, like the weight-average molecular weight (Mw), indicated as a polystyrene-equivalent number-average molecular weight measured by gel permeation chromatography (GPC).

A mixture of 40 parts by mass of the solution of the dispersed polymer with 30 parts by mass of Pigment Blue 15:3 (a copper phthalocyanine pigment, Clariant), 100 parts by mass of a 0.1 mol/L aqueous sodium hydroxide solution, and 30 parts by mass of methyl ethyl ketone was stirred with a homogenizer for 30 minutes. Then 300 parts by mass of ion-exchanged water was added, and the mixture was stirred for another 1 hour. A rotary evaporator was then used to distill away all of methyl ethyl ketone and some of water. The pH of the residue was neutralized and adjusted to 9 with 0.1 mol/L sodium hydroxide, and the mixture was filtered through a 0.3-μm membrane filter. A cyan pigment dispersion with a solid concentration (dispersed polymer and Pigment Blue 15:3) of 20% was prepared in this way. The molecular weight dispersity (Mw/Mn) of the dispersed polymer in the C was 3.0.

Preparation of the Ink Compositions

Each ink composition was obtained by mixing materials in the proportions (unit: % by mass) specified in Table 1 and thoroughly stirring the mixture. More specifically, each ink composition was prepared by mixing the materials to uniformity and removing insoluble matter with a filter.

Surface Tension Measurement

The surface tension (N/m) of each ink composition was measured with the use of "CBVP-Z" surface tensiometer available from Kyowa Interface Science Co., Ltd.

TABLE 1

| | | Ink 1-1 | Ink 1-2 | Ink 2-1 | Ink 2-2 |
|---|---|---|---|---|---|
| Dispersion | Cyan dispersion (solid concentration 20%) | 18.50 | 18.50 | 18.50 | 18.50 |
| Resins | Urethane cohesive resin (solid concentration 30%) | 16.67 | | | |
| | Acrylic cohesive resin (solid concentration 30%) | | 16.67 | | |
| | Acrylic non-cohesive resin (solid concentration 44%) | | | 11.36 | 9.09 |
| | Silicone non-cohesive resin (solid concentration 38%) | | | | 2.63 |
| Humectants | Glycerol | 10 | 10 | 10 | 10 |
| | TEG | 5.5 | 5.5 | 5.5 | 5.5 |
| Cyclic amide compound | 2-Pyrrolidone | 4 | 4 | 4 | 4 |
| Surfactant | BYK348 | 0.8 | 0.8 | 1.0 | 1.0 |
| Water | Ultrapure water | Balance | Balance | Balance | Balance |
| Surface tension | | 30 | 30 | 25 | 25 |

Determination of Cohesiveness

As aqueous resin solutions, 20% by mass aqueous solutions of the urethane cohesive resin, the acrylic cohesive resin, the acrylic non-cohesive resin, and the silicone non-cohesive resin were prepared. As aqueous coagulant solutions, 10% by mass aqueous solutions of polyallylamine and calcium nitrate were prepared.

Ten milliliters of each aqueous coagulant solution was combined with 0.2 mL of each aqueous resin solution, and the resulting mixtures were thoroughly stirred to form mixed solutions. Each of the mixed solutions was allowed to pass through a filter with a pore size of 5 μm, and the filter was visually inspected for any aggregate blocked by the filter. The results are summarized in Table 2.

TABLE 2

| | Cohesiveness | |
|---|---|---|
| | Aqueous polyallylamine solution (10% by mass) | Aqueous calcium nitrate solution (10% by mass) |
| Urethane cohesive resin (solid concentration 20%) | Cohesive | Cohesive |
| Acrylic cohesive resin (solid concentration 20%) | Cohesive | Cohesive |
| Acrylic non-cohesive resin (solid concentration 20%) | Non-cohesive | Non-cohesive |
| Silicone non-cohesive resin (solid concentration 20%) | Non-cohesive | Non-cohesive |

Preparation of Pretreatment Liquids

Pretreatment liquids were prepared as follows.

Aqueous Calcium Nitrate Solution

The following materials were mixed to make the total mass 100% by mass: 20% by mass calcium nitrate tetrahydrate (calcium ion concentration 17.0% by mass) as a multivalent metal compound, 10% by mass acrylic resin emulsion (Shin-Nakamura Chemical NK Binder R-5HN, 44% solids), 0.1% by mass BYK-348 (a polysiloxane surfactant, a trade name of a BYK product), and ion-exchanged water (balance). The mixture was thoroughly stirred to uniformity to form aqueous solution (a pretreatment agent). In the pretreatment agent the calcium ion concentration was 3.4% by mass, and the solid concentration of the anionic resin was 4.4% by mass.

Aqueous Polyallylamine Solution

PAA-HCL-03 (a trade name of a NITTOBO MEDICAL product, 40% solids) as a cationic resin was mixed with water, and the mixture was thoroughly stirred to form polyallylamine solution (a pretreatment agent). In the pretreatment agent the polyallylamine concentration was 5% by mass.

Fabric

The fabric as a recording medium was a plain-woven 100% cotton fabric.

Ink Jet Textile Printing Apparatus

A printer with line heads like the apparatus illustrated in FIG. 4 was used. Modifications were as follows.

The pretreatment liquid applicator was a roller, with which the pretreatment liquid was manually applied with the amount applied controlled at 90% to 100% by mass of the fabric. The first head and the second head were line heads. These line heads were ones in which multiple heads were in a staggered arrangement as illustrated in FIG. 3, and the nozzle resolution of each head was 360 npi (nozzles per inch).

Examples 1 to 9 and Comparative Examples 1 to 5

The printer was used to apply the pretreatment liquid to the fabric with the pretreatment liquid applicator. Then the first ink composition was discharged from the first recording head so that the first ink composition should be applied to the fabric, and the second ink composition was discharged from the second recording head so that the second ink composition should be applied to the fabric. In this way, printed fabrics were obtained with a single-color solid pattern. The total amount of the first ink composition and the second ink composition applied was controlled to make the duty 100%. The ratio of amount A to amount B (A/B), where A is the amount of the first ink composition applied per unit area of the fabric and B is the amount of the second ink composition applied per unit area of the fabric, was changed as indicated in Table 3. The printed fabrics were subjected to the following tests. Note that in Comparative Example 4 no second ink composition was discharged, and in Comparative Example 5 no first ink composition was discharged.

Color Developability Test

The OD of each printed fabric was measured with a commercially available colorimeter (X-Rite GretagMacbeth Spectrolino). The measured OD was used to evaluate color developability in accordance with the evaluation criteria.

Evaluation Criteria

A: OD 1.4 or more

B: OD 1.2 or more and less than 1.4

C: OD less than 1.2

Banding Test

The banding of each printed fabric was evaluated. The evaluation criteria were as follows.

Evaluation Criteria

A: No banding was observed.

B: Although lines resulting from banding were slightly visible along the direction of transport, they were acceptable for practical use.

C: Lines resulting from banding were clearly visible along the direction of transport and unacceptable for practical use.

Image Solidity Test

Each printed fabric was visually inspected and how much the print surface was filled was assessed. White spaces were evaluated in accordance with the criteria below.

Evaluation Criteria

A: The solid pattern was uniformly solid and contained no white spaces.

B: Although with some white spaces in the solid pattern, the image was generally uniform.

C: The solid pattern contained clearly visible white spaces resulting from incomplete filling, and the white spaces were unacceptable for practical use.

Abrasion Resistance Test

The abrasion resistance of each printed fabric was evaluated with a color fastness rubbing tester (TESTER SANGYO CO., LTD.) in accordance with JIS K5701 (ISO 11628) (a standard that specifies methods for testing lithographic inks, colored specimens, and printed fabrics). The evaluation criteria were as follows.

Evaluation Criteria

A: Grade 3.5 or better

B: Grade 3 or better and worse than 3.5

C: Worse than grade 3

Texture Retention Test

Each printed fabric was subjected to sensory evaluation. More specifically, five panelists evaluated the printed fabrics by answering "compares favorably with the natural texture retention of the fabric" or "the printed textile feels rough and the natural texture retention of the fabric has been damaged," and the printed fabrics were graded in accordance with the criteria below. The results are summarized in Table 3.

A: Four or more panelists answered "compares favorably with the natural texture retention of the fabric."

B: Three panelists answered "compares favorably with the natural texture retention of the fabric."

C: Less than three panelists answered "compares favorably with the natural texture retention of the fabric."

TABLE 3

| | | Example 1 | Example 2 | Example 3 | Example 4 | Example 5 | Example 6 | Example 7 | Example 8 | Example 9 |
|---|---|---|---|---|---|---|---|---|---|---|
| Inks | First ink composition | Ink 1-1 | Ink 1-1 | Ink 1-1 | Ink 1-2 | Ink 1-2 | Ink 1-1 | Ink 1-1 | Ink 1-1 | Ink 1-1 |
| | Second ink composition | Ink 2-1 | Ink 2-2 | Ink 2-1 | Ink 2-1 | Ink 2-2 | Ink 2-1 | Ink 2-1 | Ink 2-1 | Ink 2-1 |
| Pretreatment liquid | Aqueous polyallylamine solution | ○ | ○ | ○ | ○ | ○ | ○ | ○ | ○ | — |
| | Aqueous calcium nitrate solution | — | — | — | — | — | — | — | — | ○ |
| Amounts applied | Ratio of amount A to amount B (A/B) | 70/30 | 70/30 | 60/40 | 60/40 | 60/40 | 50/50 | 40/60 | 30/70 | 60/40 |
| Characteristics | Color developability test | A | A | A | A | A | A | B | B | A |
| | Banding test | B | B | A | A | A | A | A | B | A |
| | Image solidity test | A | A | A | A | A | A | B | B | A |
| | Abrasion resistance test | B | A | A | A | A | A | A | A | B |
| | Texture retention test | B | A | A | A | A | A | A | A | B |

| | | Comparative Example 1 | Comparative Example 2 | Comparative Example 3 | Comparative Example 4 | Comparative Example 5 |
|---|---|---|---|---|---|---|
| Inks | First ink composition | Ink 1-1 | Ink 2-1 | Ink 1-1 | Ink 1-1 | None |
| | Second ink composition | Ink 1-1 | Ink 2-1 | Ink 2-1 | None | Ink 2-1 |
| Pretreatment liquid | Aqueous polyallylamine solution | ○ | ○ | — | ○ | ○ |
| | Aqueous calcium nitrate solution | — | — | — | — | — |
| Amounts applied | Ratio of amount A to amount B (A/B) | 60/40 | 60/40 | 60/40 | 100/0 | 0/100 |
| Characteristics | Color developability test | A | C | C | A | C |
| | Banding test | A | A | A | C | C |
| | Image solidity test | B | B | A | C | C |
| | Abrasion resistance test | C | B | A | C | B |
| | Texture retention test | C | A | B | C | A |

The printed fabric of Comparative Example 1, in which a second ink composition, i.e., an ink composition containing a non-cohesive resin, was not used, was found to be inferior in texture retention and abrasion resistance as a result of spaces in the aggregate not filled with non-cohesive resin. The printed fabric of Comparative Example 1, in which a first ink composition, i.e., an ink composition containing a cohesive resin, was not used, was found to be inferior in color developability as a result of the pigment not fixed with resin aggregate.

The printed fabric of Comparative Example 3, in which no pretreatment liquid was used, was found to be inferior in color developability as a result of the pigment not fixed with resin aggregate. The printed fabric of Comparative Example 4, in which only one head was used and no second ink composition was used, was found to be inferior in the solidity of the image, as well as texture retention and abrasion resistance, because of banding due to the omission of the application of a second ink composition. The printed fabric of Comparative Example 5, in which only one head was used and no first ink composition was used, was found to be inferior in the solidity of the image, as well as color developability, because of banding due to the omission of the application of a first ink composition.

The entire disclosure of Japanese Patent Application No. 2013-170171, filed Aug. 20, 2013 is expressly incorporated by reference herein.

What is claimed is:

1. An ink jet textile printing method comprising:

applying a pretreatment liquid containing a coagulant to a fabric;

then discharging a first ink composition containing water, a first pigment, and a cohesive resin from a first recording head to apply the first ink composition to the fabric, wherein a content of the water is in the range of 20 to 80% by mass, a content of the first pigment is in the range of 1 to 30% by mass, and a content of the cohesive resin is in the range of 1 to 15% by mass, based on a total mass of the first ink composition;

then discharging a second ink composition containing water, a second pigment, and a non-cohesive resin from a second recording head to apply the second ink composition to the fabric, wherein a content of the water is in the range of 20 to 80% by mass, a content of the second pigment is in the range of 1 to 30% by mass, and a content of the non-cohesive resin is in the range of 1 to 15% by mass, based on a total mass of the second ink composition;

aggregating the first pigment and the cohesive resin in the first ink composition through reaction with the pretreatment liquid on the fabric such that aggregates of the first pigment remain on the surface of the fabric; and aggregating the second pigment in the second ink composition through reaction with the pretreatment liquid such that aggregates of the second pigment remain on the surface of the fabric, and the non-cohesive resin in the second ink composition does not aggregate on the fabric.

2. The ink jet textile printing method according to claim 1, wherein at least one of the first recording head and the second recording head is a line head.

3. The ink jet textile printing method according to claim 1, wherein the second ink composition is applied after the first ink composition is applied.

4. The ink jet textile printing method according to claim 1, wherein a static surface tension of the second ink composition at 25° C. is smaller than a static surface tension of the first ink composition at 25° C.

5. The ink jet textile printing method according to claim 1, wherein the cohesive resin is urethane resin.

6. The ink jet textile printing method according to claim 1, wherein the non-cohesive resin includes at least one or acrylic resin and silicone resin.

7. The ink jet textile printing method according to claim 1, wherein the coagulant is a cationic resin.

8. The ink jet textile printing method according to claim 1, wherein a ratio A:B, where A is an amount of the first ink composition applied per unit area of the fabric and B is an amount of the second ink composition applied per unit area of the fabric, is from 40:60 to 60:40 on a mass basis.

* * * * *